US009654686B2

(12) United States Patent
Hara et al.

(10) Patent No.: US 9,654,686 B2
(45) Date of Patent: May 16, 2017

(54) LOCATION INFORMATION DESIGNATING DEVICE, LOCATION INFORMATION DESIGNATING METHOD, AND NON-TRANSITORY STORAGE MEDIUM IN WHICH LOCATION INFORMATION DESIGNATING PROGRAM IS STORED

(71) Applicant: Olympus Corporation, Shibuya-ku, Tokyo (JP)

(72) Inventors: Satoshi Hara, Hino (JP); Koichi Shintani, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 14/885,633

(22) Filed: Oct. 16, 2015

(65) Prior Publication Data

US 2016/0112633 A1    Apr. 21, 2016

(30) Foreign Application Priority Data

Oct. 21, 2014  (JP) ................................. 2014-214706

(51) Int. Cl.
 *H04N 5/232* (2006.01)
(52) U.S. Cl.
 CPC ..... *H04N 5/23225* (2013.01); *H04N 5/23206* (2013.01); *H04N 5/23293* (2013.01)
(58) Field of Classification Search
 CPC ........... H04N 5/23225; H04N 5/23293; H04N 5/23206
 See application file for complete search history.

(56) References Cited

U.S. PATENT DOCUMENTS

| | | | | |
|---|---|---|---|---|
| 2006/0001757 A1* | 1/2006 | Sawachi | ................. | H04N 5/232 348/333.12 |
| 2007/0035639 A1* | 2/2007 | Aridome | ................. | G01C 21/20 348/231.3 |
| 2008/0297608 A1* | 12/2008 | Border | ............... | H04N 5/23203 348/207.11 |
| 2010/0073487 A1* | 3/2010 | Sogoh | .................... | H04N 5/772 348/207.1 |
| 2013/0182138 A1* | 7/2013 | Cho | ................... | H04N 5/23206 348/211.3 |

(Continued)

FOREIGN PATENT DOCUMENTS

JP         2006-14119          1/2006

*Primary Examiner* — Jason Flohre
(74) *Attorney, Agent, or Firm* — John C. Pokotylo; Straub & Pokotylo

(57) ABSTRACT

A location information designating device includes a location confirming image acquiring section, a display control section, an operating unit that designates a target location in the location confirming image displayed in the display; and a communicating unit. The location confirming image acquiring section acquires a location confirming image by which location information is confirmable. The display control section displays the acquired location confirming image in a display. The operating unit designates a target location in the location confirming image displayed in the display. The communicating unit transmits, to an external information device, information of the designated target location and the acquired location confirming image together with a request for an action to be performed by a user of the external information device.

10 Claims, 13 Drawing Sheets

(56) References Cited

U.S. PATENT DOCUMENTS

| | | | | |
|---|---|---|---|---|
| 2013/0222612 A1* | 8/2013 | Sako | ............. | H04N 5/23293 |
| | | | | 348/207.1 |
| 2014/0223319 A1* | 8/2014 | Uchida | ............. | G06F 17/30277 |
| | | | | 715/739 |
| 2015/0271393 A1* | 9/2015 | Cudak | ............. | H04N 5/23222 |
| | | | | 348/159 |
| 2016/0080643 A1* | 3/2016 | Kimura | ............. | H04N 5/23206 |
| | | | | 348/207.1 |

* cited by examiner

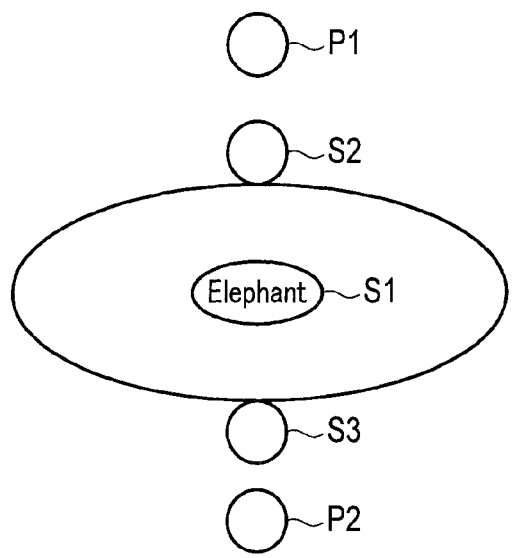
F I G. 2A
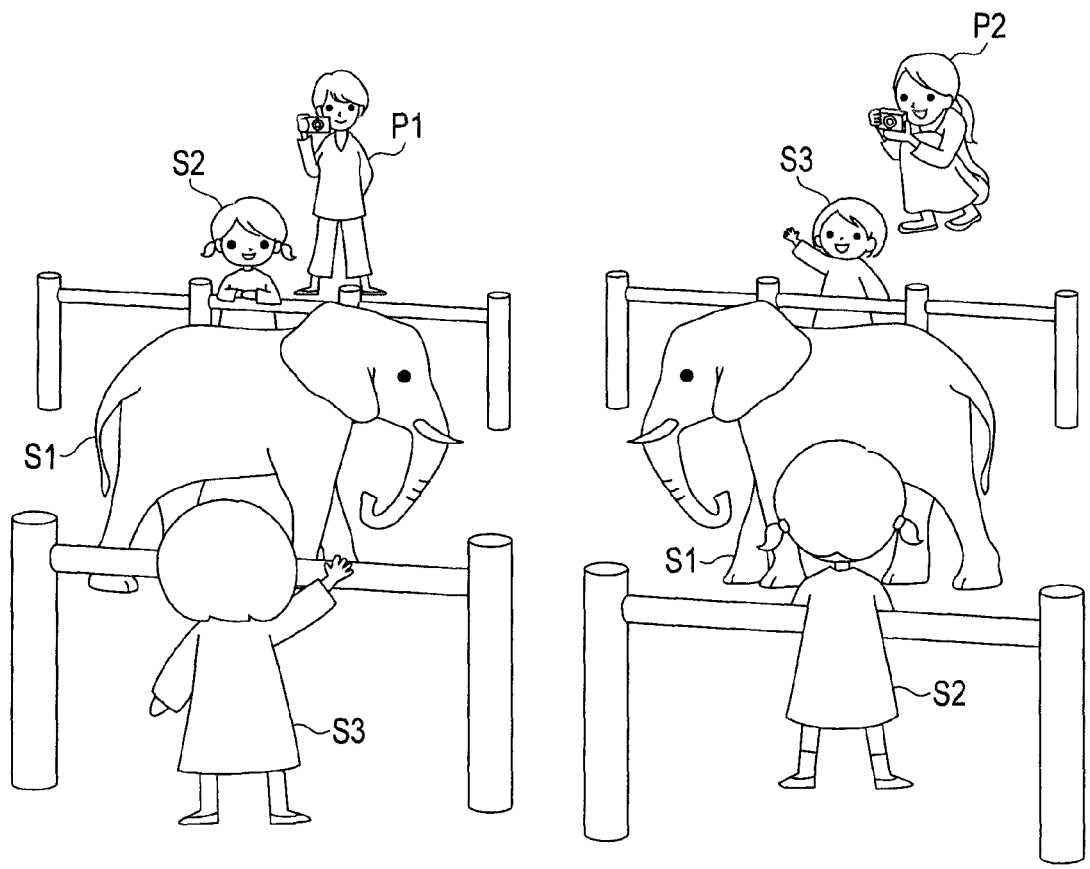
F I G. 2B     F I G. 2C

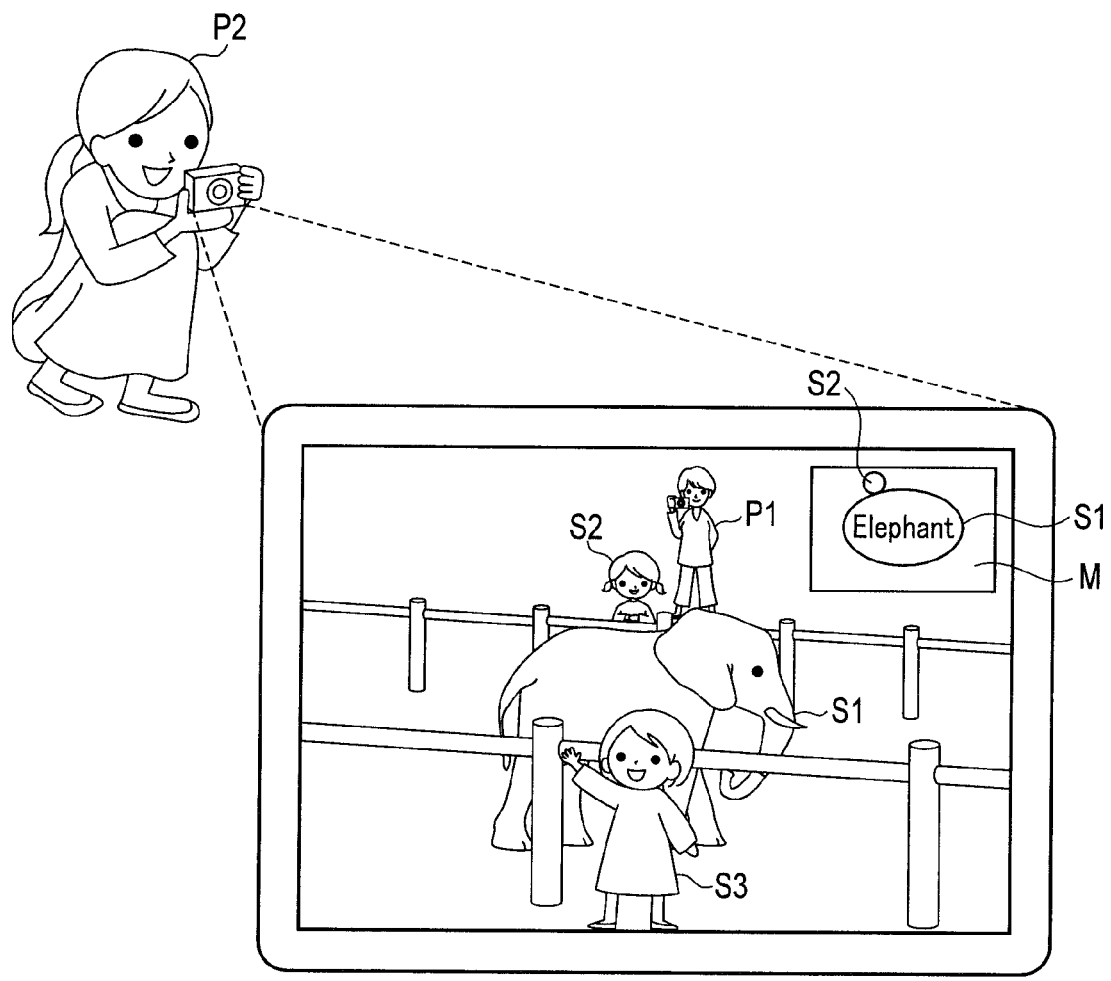
F I G. 3

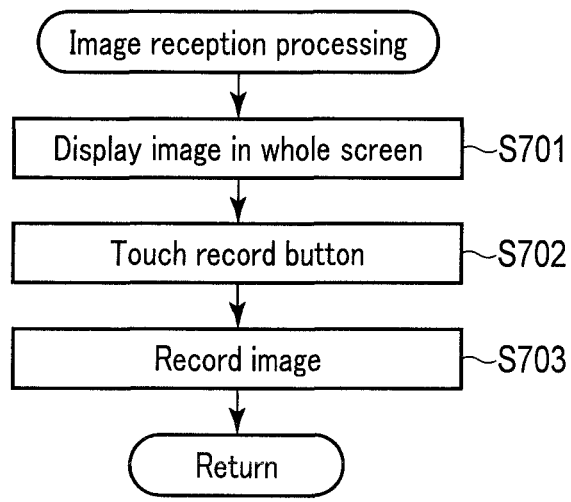
F I G. 10

LOCATION INFORMATION DESIGNATING DEVICE, LOCATION INFORMATION DESIGNATING METHOD, AND NON-TRANSITORY STORAGE MEDIUM IN WHICH LOCATION INFORMATION DESIGNATING PROGRAM IS STORED

CROSS-REFERENCE TO RELATED APPLICATIONS

This application is based upon and claims the benefit of priority from the prior Japanese Patent Application No. 2014-214706, filed Oct. 21, 2014, the entire contents of which are incorporated herein by reference.

BACKGROUND OF THE INVENTION

1. Field of the Invention

The present invention relates to a location information designating device to designate location information, a location information designating method, and a non-transitory storage medium in which a location information designating program is stored.

2. Description of the Related Art

As a technology of designating a photographing position to another person, there is known, for example, a technology of a publication of Jpn. Pat. Appln. KOKAI Publication No. 2006-14119. In a system of the publication of Jpn. Pat. Appln. KOKAI Publication No. 2006-14119 in which a video camera is connected to a client via a network, information of the photographing position instructed by the client is transmitted to the video camera via the network. A photographer recognizes the instruction of the client from information displayed in a display of the video camera, and can therefore perform photographing as requested by the client.

BRIEF SUMMARY OF THE INVENTION

According to a first aspect of the invention, a location information designating device comprises: a location confirming image acquiring section that acquires a location confirming image by which location information is confirmable; a display control section that displays the acquired location confirming image in a display; an operating unit that designates a target location in the location confirming image displayed in the display; and a communicating unit that transmits, to an external information device, information of the designated target location and the acquired location confirming image together with a request for an action to be performed by a user of the external information device.

According to a second aspect of the invention, a location information designating method comprises: acquiring a location confirming image by which location information is confirmable; displaying the acquired location confirming image in a display; designating a target location in the location confirming image displayed in the display; and transmitting, to an external information device, information of the designated target location and the acquired location confirming image together with a request for an action to be performed by a user of the external information device.

According to a third aspect of the invention, a non-transitory storage medium in which there is stored a location information designating program comprises: acquiring a location confirming image by which location information is confirmable; displaying the acquired location confirming image in a display; designating a target location in the location confirming image displayed in the display; and transmitting, to an external information device, information of the designated target location and the acquired location confirming image together with a request for an action to be performed by a user of the external information device.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute apart of the specification, illustrate embodiments of the invention, and together with the general description given above and the detailed description of the embodiments given below, serve to explain the principles of the invention.

FIG. 2A, FIG. 2B and FIG. 2C are views showing examples of a photographing scene to be presumed in a photographing system to which the communication system according to the one embodiment of the present invention is applied;

FIG. 3 is a view to explain an outline of an operation of the communication system according to the one embodiment of the present invention;

FIG. 10 is a flowchart showing image reception processing;

DETAILED DESCRIPTION OF THE INVENTION

Figure 1:
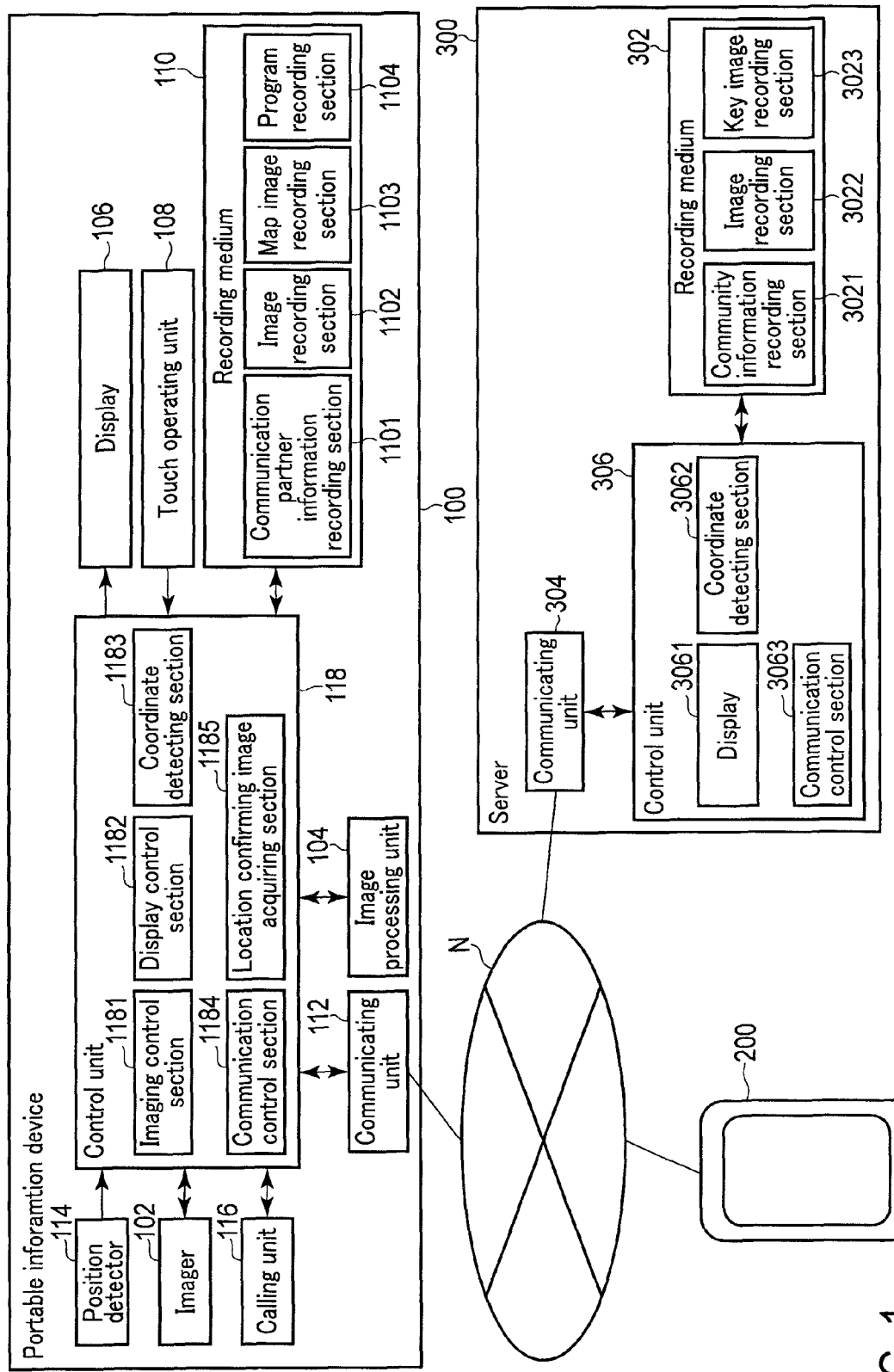
FIG. 1 is a view showing a constitution of a communication system including a location information designating device according to one embodiment of the present invention.

Hereinafter, embodiments of the present invention will be described with reference to the drawings. FIG. 1 is a view showing a constitution of a communication system including a location information designating device according to one embodiment of the present invention. The communication system shown in FIG. 1 includes portable information devices 100 and 200 and a server 300. The portable information devices 100 and 200 and the server 300 are communicably connected. The portable information devices 100 and 200 are, for example, smart phones. It is to be noted that, as the portable information devices 100 and 200, various portable information devices such as a digital camera having a communicating function and the like are applicable.

The portable information device 100 and the portable information device 200 may have the same constitution or have different constitutions. Hereinafter, to simplify description, it is assumed that the portable information device 100 has the same constitution as in the portable information device 200, and the detailed constitution of the portable information device 100 will be described.

The portable information device 100 includes an imager 102, an image processing unit 104, a display 106, a touch operating unit 108, a recording medium 110, a communicating unit 112, a position detector 114, a calling unit 116, and a control unit 118.

The imager 102 includes a photographing optical system, a diaphragm, an imaging element, and an imaging signal processing circuit, and images a subject to generate image data concerning the subject. The photographing optical system condenses a light flux from the unshown subject. The diaphragm regulates a quantity of the light flux that enters a light receiving surface of the imaging element. The imaging element has the light receiving surface on which an image of the light flux condensed by the photographing optical system is formed. In the light receiving surface, pixels such as photo diodes are two-dimensionally arranged. In addition, a color filter is disposed on a light entering side of the light receiving surface. Such an imaging element converts the image (a subject image) corresponding to the light flux and formed on the light receiving surface into an electric signal (hereinafter referred to as an imaging signal) corresponding to the quantity of light. The imaging signal processing circuit subjects the imaging signal obtained by the imaging element to analog processing such as AGC (automatic gain control). In addition, the imaging signal processing circuit converts the analog processed imaging signal into a digital signal (hereinafter referred to as the image data).

The image processing unit 104 performs various types of image processing to the image data obtained by the imager 102. The image processing includes white balance correction processing, color correction processing, gamma (γ) correction processing, enlargement/reduction processing, compression processing and the like. In addition, the image processing section 104 also subjects the compressed image data to extension processing.

The display 106 is, for example, a liquid crystal display (LCD), and displays various images such as an image for live view (a live view image) and an image recorded in the recording medium 110. The touch operating unit 108 is formed integrally on a display screen of the display 106 to detect a contact position of a user's finger or the like on the display screen, or the like.

The recording medium 110 is, for example, a flash memory included in the portable information device 100. The recording medium 110 includes a communication partner information recording section 1101, an image recording section 1102, a map image recording section 1103, and a program recording section 1104. In the communication partner information recording section 1101, information of a communication partner of the portable information device 100 is recorded. This information of the communication partner is, for example, a user's name of the portable information device 200 or a URL to access the server 300. In the image recording section 1102, the image data obtained by a photographing operation is recorded. Additionally, in the image recording section 1102, a face image for use in after-mentioned photographing request processing is recorded. In the map image recording section 1103, map image data is recorded. This map image data is one example of location confirming image data including information by which an after-mentioned user of the portable information device of a photographing request destination can be informed of a location of a target subject that becomes at least a photographing target. This map image data does not necessarily have to be the image data of "a map". For example, the map image data may be the image data of a sketch. In addition, the map image data may be data obtained by photographing a map drawn on a signboard or a handwritten map, or the like. Furthermore, the map image data is not limited to two-dimensional image data, but may be three-dimensional image data. In the program recording section 1104, a program and setting data for use in the control unit 118 of the portable information device 100 is recorded. Furthermore, in the program recording section 1104 of the present embodiment, cooperating software to control cooperative photographing of the portable information device 100 and the portable information device 200 is recorded. Details of the cooperating software will be described later.

The communicating unit 112 includes various wireless communicating interfaces such as an interface for mobile phone communication and an interface for wireless LAN communication. The communicating unit 112 performs communication with the portable information device 200 or the server 300. The communicating unit 112 of the example of FIG. 1 communicates with the portable information device 200 or the server 300 via a network N. However, the communicating unit 112 may be configured to communicate with the portable information device 200 or the like by short distance wireless communication via no network N.

The position detecting unit 114 includes, for example, GPS receiving unit, and detects a position of the portable information device 100. Furthermore, an electronic compass or the like may be disposed in the position detecting unit 114 so that the position detecting unit 114 can detect an azimuth.

The calling unit 116 includes a microphone and a speaker. The microphone and speaker of the calling unit 116 are disposed for a calling function in the portable information device 100.

The control unit 118 is constituted of, for example, ASIC including a CPU and a memory, and controls an operation of each block of the portable information device 100 in accordance with a program recorded in the program recording section 1104 of the recording medium 110.

The control unit 118 has a function of an imaging control section 1181, a function of a display control section 1182, a function of a coordinate detecting section 1183, a function of a communication control section 1184, and a function of a location confirming image acquiring section 1185. The function of the imaging control section 1181 is a function of controlling an imaging operation by the imager 102. The function of the display control section 1182 is a function of controlling display of various images to the display 106. The function of the coordinate detecting section 1183 is a function of acquiring a coordinate of a location designated by a user's operation of the touch operating unit 108 in the image displayed in the display 106. By this function, contents of a touching operation and the like are distinguished. The function of the communication control section 1184 is a function of executing control during communication of the portable information device 100 or the server 300 via the communicating unit 112. The function of the location confirming image acquiring section 1185 is a function of acquiring the map image data as one example of a location confirming image. The map image data is acquired as the image data acquired as the result of the imaging by the imager 102, or the like.

Here, the respective functions of the control unit 118 may be realized by hardware separate from the control unit 118.

The server 300 includes a recording medium 302, a communicating unit 304, and a control unit 306. The server 300 supplies various services to the portable information device 100 and the portable information device 200 via the network N.

The recording medium 302 includes a community information recording section 3021, an image recording section 3022, and a key image recording section 3023. In the community information recording section 3021, information of the user belonging to a community is recorded. This user's information is, for example, a user's ID. In the image recording section 3022, the image data transmitted from the portable information device 100 or the portable information device 200 is recorded. In the key image recording section 3023, the map image data as a key image is recorded for each community.

The communicating unit 304 performs communication with the portable information device 100 or the portable information device 200 via the network N.

The control unit 306 includes, for example, a CPU and a memory, and controls an operation of the server 300.

The control unit 306 has a function of a display control section 3061, a function of a coordinate detecting section 3062, and a function of a communication control section 3063. The function of the display control section 3061 is a function of transmitting the image data or the like to the portable information device 100 or the portable information device 200 via the communicating unit 304, to display a specific screen in the portable information device 100 or the portable information device 200. The function of the coordinate detecting section 3062 is a function of acquiring, via the network N, the coordinate of the location designated by the user's operation of the touch operating unit 108 in the image displayed in the display 106 of the portable information device 100 and a display of the portable information device 200. The function of the communication control section 3063 is a function of executing control during the communication of the server 300 with the portable information device 100 or the portable information device 200 via the communicating unit 304. It is to be noted that the respective functions of the control unit 306 may be realized by hardware separate from the control unit 306.

Hereinafter, an outline of an operation of the communication system according to the present embodiment will be described. FIG. 2A, FIG. 2B and FIG. 2C are views showing examples of a photographing scene to be presumed in a photographing system to which the communication system of the present embodiment is applied. FIG. 2A shows a state where a photographing scene of one example is seen from the sky. As shown in FIG. 2A, in the photographing scene of the one example, an elephant S1 as a subject is present in a fence. In this photographing scene, a child S2 and a child S3 as the other subjects are positioned around the fence. In addition, a father P1 as a photographer is positioned near the child S2, and a mother P2 as a photographer is positioned near the child S3. Additionally, the child S2 does not face the father P1, and the child S3 also does not face the mother P2. Furthermore, as shown in FIG. 2A, the father P1, the child S2, the elephant S1, the child S3 and the mother P2 are substantially linearly arranged in this order. That is, as shown in FIG. 2B, the mother P2 can take a photograph in which the child S3, the elephant S1, the child S2 and the father P1 are shown. Additionally, as shown in FIG. 2C, the father P1 can take a photograph in which the child S2, the elephant S1, the child S3 and the mother P2 are shown.

In the communication system according to the present embodiment, a photographing requester (e.g., the father P1) who possesses the portable information device 100 as the location information designating device requests photographing to the photographer (e.g., the mother P2) who possesses the portable information device 200. When the photographing is requested, a map image around the photographing requester is displayed in the display 106 of the portable information device 100 of the photographing requester.

The photographing requester designates, for example, a photographing location or a location of the subject of a photographing object while seeing the map image displayed in the display 106. For example, it is assumed that the child S2 is designated as the subject of the photographing object. A coordinate in this designated map image is detected by the function of the coordinate detecting section 1183 of the control unit 118. Afterward, the map image including designating information of the location is transmitted from the portable information device 100 to the portable information device 200.

In the display of the portable information device 200, a map image M including the designating information of the location (the information indicating the location of the child S2 in the example) is displayed. The photographer photographs the subject present at the location requested by the photographing requester while seeing the map image displayed as shown in FIG. 3. In consequence, the photographer can be requested to take a photograph which cannot be taken by the photographing requester.

Consequently, in the communication system of the present embodiment, the photographing is performed by a cooperative operation of the portable information device 100 and the portable information device 200. In the communication system of the present embodiment, the photographing requester can easily and suitably perform a request for map photographing. In addition, the photographer performs the photographing while seeing the map image of the location, and hence, the photograph can be taken as requested by the photographing requester.

Hereinafter, the operation of the communication system according to the present embodiment will further specifically be described. FIG. 4 to FIG. 10 are flowcharts to explain the operation of the communication system according to the present embodiment. The processing shown from FIG. 4 to FIG. 10 is controlled by the control units 118 of the portable information device 100 and the portable information device 200. In addition, FIG. 11A to FIG. 11L and FIG. 12A to FIG. 12F are views showing transitions of the screen to be displayed in the display of the portable information device 100 or the displaying section of the portable information device 200 in accordance with the operation shown from FIG. 4 to FIG. 10. Here, in the following description, the portable information device 100 is defined as a portable information device (the location information designating device) of a photographing request source which is possessed by the photographing requester, and the portable information device 200 is defined as a portable information device of a photographing request destination which is possessed by the photographer. Needless to say, these relations may be reversed.

Figure 4:
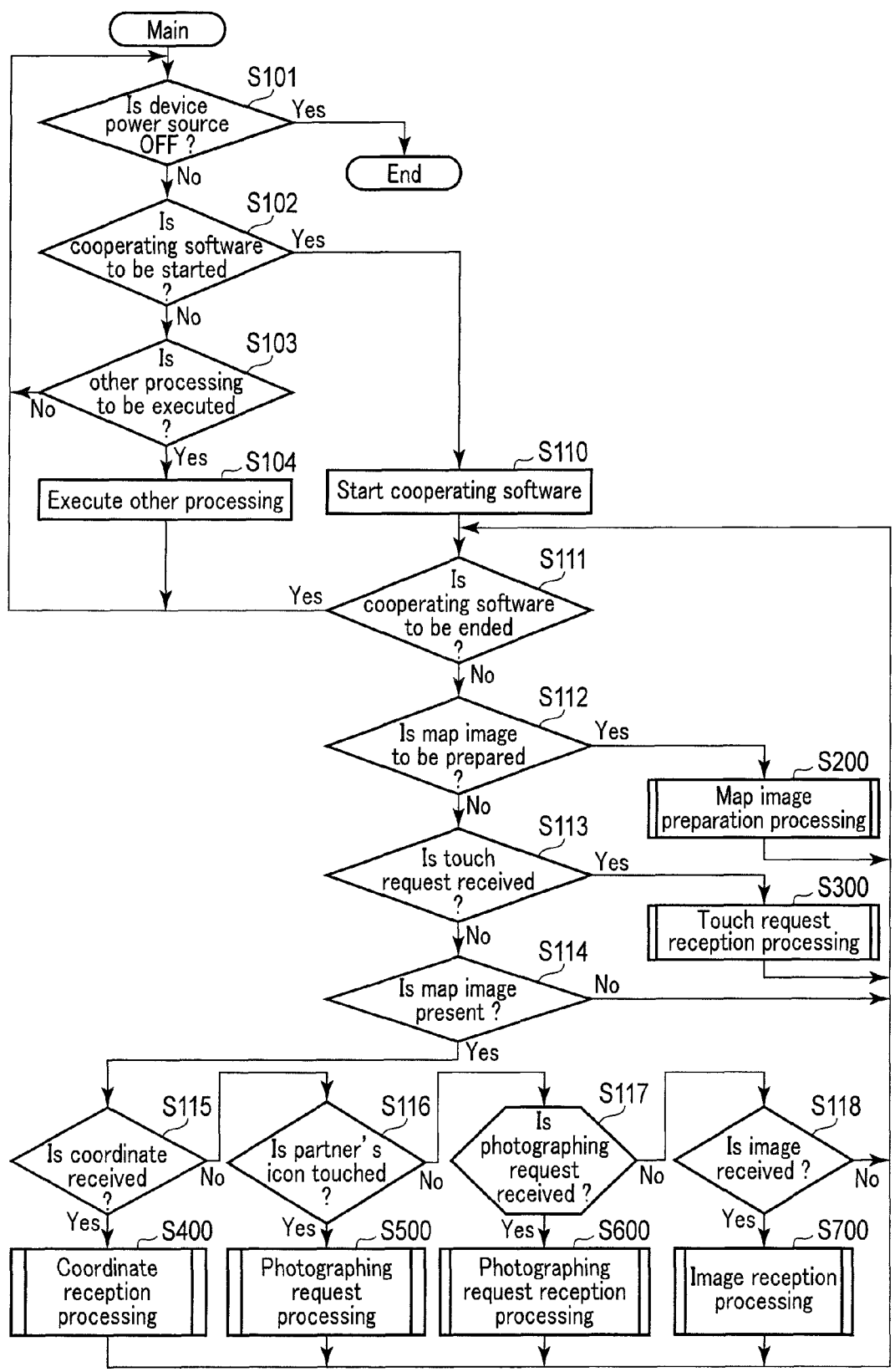
FIG. 4 is a flowchart showing main processing of a portable information device.

FIG. 4 is a flowchart showing main processing of the portable information device. Here, the processing of FIG. 4 is applied to both of the portable information device 100 and the portable information device 200. Hereinafter, in the case of the processing common to the portable information device 100 and the portable information device 200, the portable information device 100 and the portable information device 200 will be referred to as "the portable information device" together.

In step S101, the control unit 118 determines whether or not a power source of the portable information device is turned off. When it is determined in the step S101 that the power source of the portable information device is turned off, the processing of FIG. 4 is ended.

When it is determined in the step S101 that the power source of the portable information device is not turned off, the processing shifts to step S102. In the step S102, the control unit 118 determines whether or not to start the cooperating software. For example, when starting of the cooperating software is instructed by the user's operation of the touch operating unit 108 of the portable information device or when an after-mentioned touch request is received, it is determined in the step S102 that the cooperating software is to be started.

When it is determined in the step S102 that the cooperating software is not started, the processing shifts to step S103. In the step S103, the control unit 118 determines whether or not to execute processing other than the starting of the cooperating software. The processing other than the starting of the cooperating software is, for example, calling processing, electronic mail processing, or photographing processing. For example, when execution of the processing is instructed by the user's operation of the touch operating unit 108 of the portable information device, it is determined in the step S103 that the other processing is to be executed. When it is determined in the step S103 that the other processing is not executed, the processing returns to the step S101.

When it is determined in the step S103 that the other processing is to be executed, the processing shifts to step S104. In the step S104, the control unit 118 executes the processing determined to be executed. Afterward, the processing returns to the step S101.

When it is determined in the step S102 that the cooperating software is to be started, the processing shifts to step S110. In the step S110, the control unit 118 starts the cooperating software.

In step S111 after the cooperating software is started, the control unit 118 determines whether or not to end the cooperating software. For example, when the ending of the cooperating software is instructed by the user's operation of the touch operating unit 108 of the portable information device, it is determined in the step S111 that the cooperating software is to be ended. When it is determined in the step S111 that the cooperating software is to be ended, the processing returns to the step S101.

When it is determined in the step S111 that the cooperating software is not ended, the processing shifts to step S112. In the step S112, the control unit 118 determines whether or not to prepare the map image. For example, when the preparation of the map image is instructed by the user's operation of the touch operating unit 108 of the portable information device, it is determined in the step S112 that the map image is to be prepared.

Figure 5:
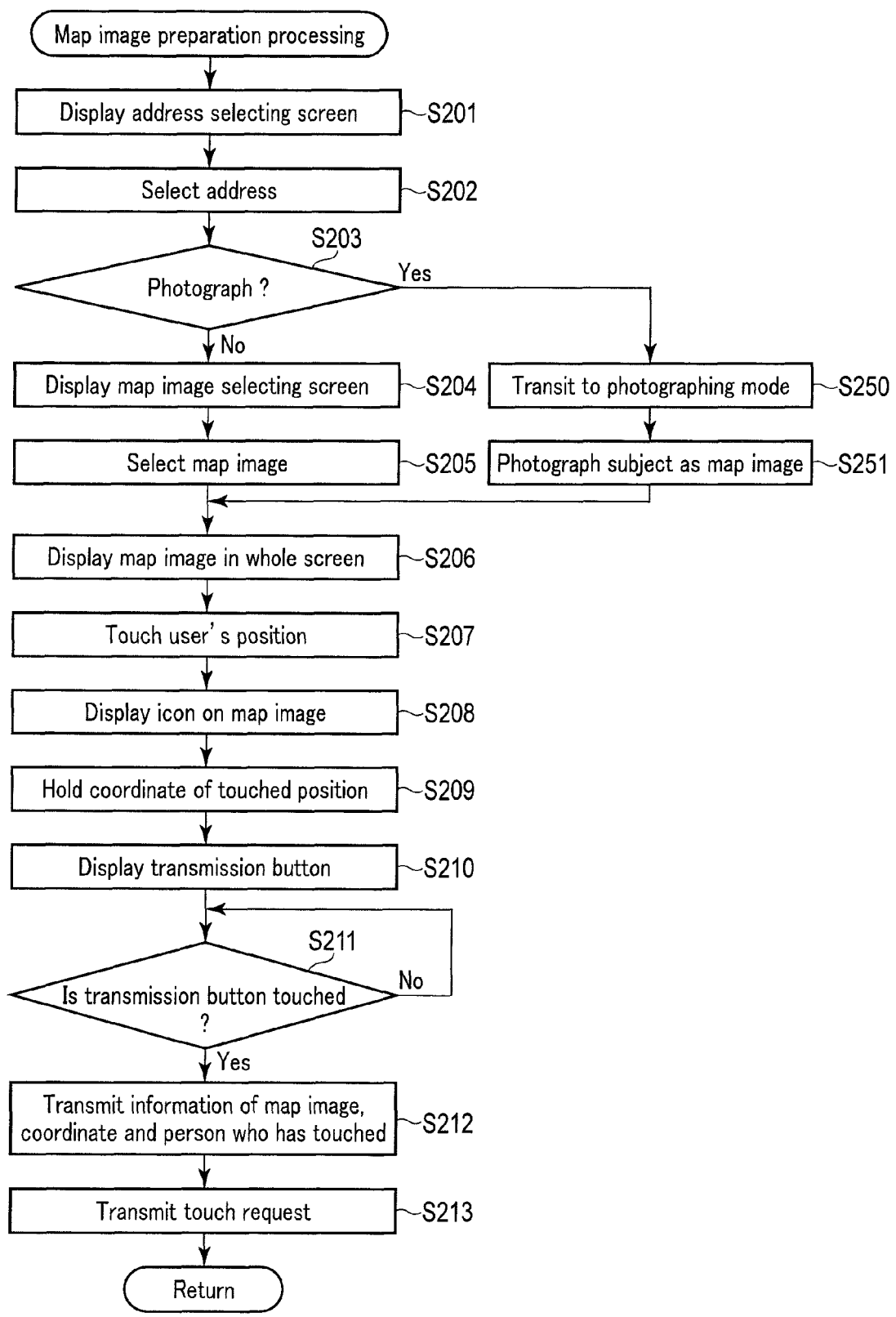
FIG. 5 is a flowchart showing map image preparation processing.

When it is determined in the step S112 that the map image is to be prepared, the processing shifts to step S200. In the step S200, the control unit 118 executes map image preparation processing. Hereinafter, the map image preparation processing will be described with reference to FIG. 5. FIG. 5 is a flowchart showing the map image preparation processing. The processing of FIG. 5 is controlled by the control unit 118 of the portable information device of the photographing request source (the portable information device 100).

Figure 11A:
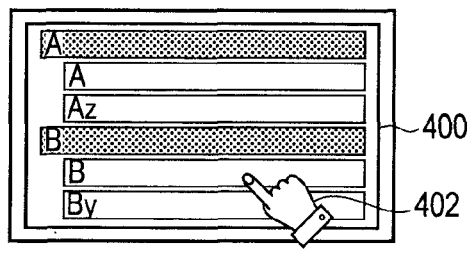
FIG. 11A, FIG. 11B, FIG. 11C, FIG. 11D, FIG. 11E, FIG. 11F, FIG. 11G, FIG. 11H, FIG. 11I, FIG. 11J, FIG. 11K and FIG. 11L are views showing examples of a screen to be displayed in a display of the portable information device of a photographing request source.

In step S201, the control unit 118 of the portable information device 100 displays such an address selecting screen as shown in FIG. 11A in the display 106. As shown in FIG. 11A, in the address selecting screen, there is displayed information indicating the communication partner recorded in the communication partner information recording section 1101 of the portable information device 100, e.g., a list 400 of user names.

In step S202, the user of the portable information device 100 touches a desirable user name among the user names displayed in the address selecting screen with a finger 402 or the like to select the communication partner to whom the photographing is requested (the user of the portable information device 200 in the example). Upon receiving this operation, the control unit 118 distinguishes the address of the communication partner selected by the user, from an output of the touch operating unit 108.

Figure 11B:
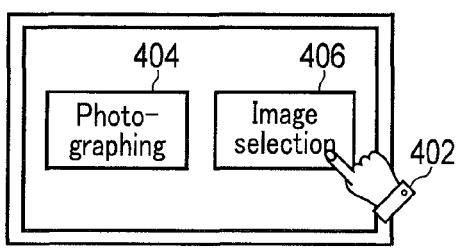

In step S203, the control unit 118 determines whether or not to perform the photographing. For this determination, the control unit 118 displays such a processing selecting screen as shown in FIG. 11B in the display 106. As shown in FIG. 11B, in the processing selecting screen, there are displayed buttons 404 and 406 indicating contents of processing to select the map image. The button 404 is a photographing button to be selected by the user when the map image is acquired by the photographing. In addition, the button 406 is an image selecting button to be selected by the user when the map image is acquired from the map image recording section 1103. For example, it is determined in the step S203 that the photographing is performed when the button 404 is selected, by the user's operation of the touch operating unit 108 of the portable information device 100.

Figure 11C:
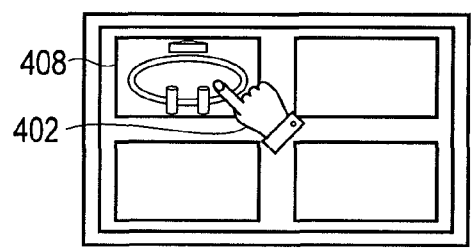

When it is determined in the step S203 that the photographing is not performed, i.e., when the image selecting button 406 is selected, the processing shifts to step S204. In the step S204, the control unit 118 displays such a map image selecting screen as shown in FIG. 11C in the display 106. As shown in FIG. 11C, in the map image selecting screen, there is displayed a list of map images 408 recorded in the map image recording section 1103. It is to be noted that the map images displayed in the list in the map image selecting screen are not limited to the map images recorded in the map image recording section 1103. For example, the map images recorded in the key image recording section 3023 of the server 300 may be displayed together in the list. In addition, the map images in the vicinity of a position detected by the position detecting unit 114 may only be displayed in the list.

In step S205, the user of the portable information device 100 touches the desirable map image among the map images displayed in the map image selecting screen with the finger 402 or the like to select the map image. The control unit 118 distinguishes the map image data selected by the user, on the basis of the output of the touch operating unit 108. Afterward, the processing shifts to step S206.

When it is determined in the step S203 that the photographing is to be performed, i.e., when the photographing button 404 is selected, the processing shifts to step S250. In the step S250, the control unit 118 transits an operation mode of the portable information device 100 to a photographing mode.

In step S251 after the operation mode of the portable information device 100 transits to the photographing mode, the user uses the portable information device 100 to perform an operation to photograph the subject as the map image. For example, the user performs the photographing operation to photograph the map drawn on the signboard or the like or performs the photographing operation to photograph the handwritten map. Upon receiving the user's photographing operation, the control unit 118 executes the photographing processing. That is, the control unit 118 operates the imager 102. Further, the control unit 118 performs the image processing of the map image data obtained by the operation of the imager 102, in the image processing unit 104. Subsequently, the control unit 118 records the map image data in the map image recording section 1103. Afterward, the processing shifts to the step S206.

Figure 11D:
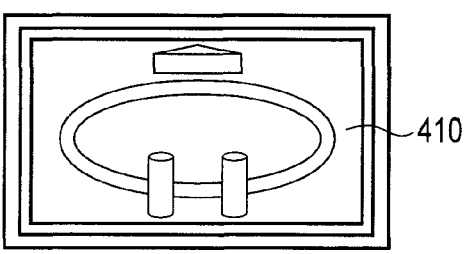

In the step S206, as shown in FIG. 11D, the control unit 118 displays a map image 410 acquired in the step S205 or the step S251 in the whole screen of the display 106.

Figure 11E:
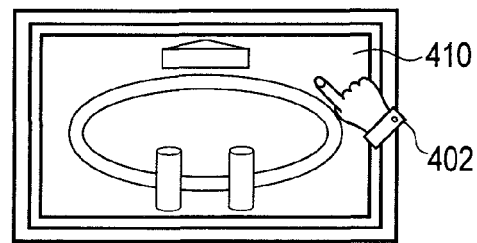

In step S207, as shown in FIG. 11E, the user of the portable information device 100 touches a position indicating a location of the user in the map image 410 displayed in the display 106. Upon receiving this operation, the control unit 118 acquires a coordinate of the location selected by the user, from the output of the touch operating unit 108.

Figure 11F:
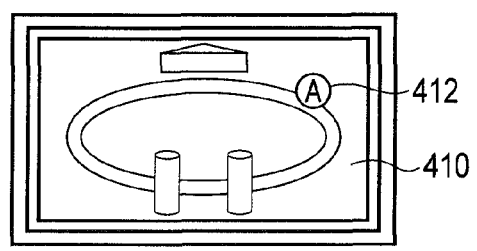

In step S208, as shown in FIG. 11F, the control unit 118 displays an icon 412 indicating the location of the user of the portable information device 100, on the map image 410 displayed in the display 106, on the basis of the coordinate acquired in the step S207.

In step S209, the control unit 118 holds coordinate data acquired in the step S207, in an unshown memory.

Figure 11G:
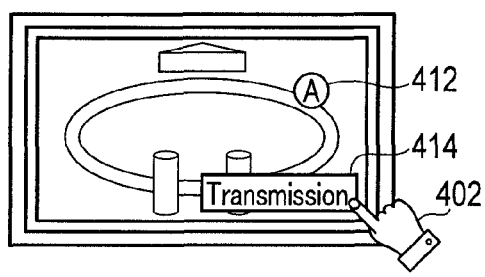

In step S210, as shown in FIG. 11G, the control unit 118 displays a transmission button 414 on the map image 410 displayed in the display 106.

In step S211, the control unit 118 determines whether or not the transmission button 414 is touched. The processing is on standby until it is determined in the step S211 that the transmission button 414 is touched. The present embodiment may have a constitution in which the map image preparation processing is ended after an elapse of predetermined time.

When it is determined in the step S211 that the transmission button 414 is touched, the processing shifts to step S212. In the step S212, the control unit 118 uses the communicating unit 112 to transmit the map image data displayed in the display 106, the coordinate data acquired in the step S207 and data indicating a person who has touched the button (e.g., data of the user name) to the portable information device of the photographing requester destination (the portable information device 200 in the example) distinguished in the step S202.

In the step S212, the control unit 118 uses the communicating section 112 to transmit the touch request to the portable information device of the photographing request destination (the portable information device 200 in the example). Afterward, the map image preparation processing is ended. After the map image preparation processing is ended, the processing returns to the step S111 of FIG. 4.

Here, the description returns to FIG. 4. When it is determined in the step S112 that the map image is not prepared, the processing shifts to step S113. In the step S113, the control unit 118 determines whether or not the touch request is received. The touch request is transmitted as the result of the map image preparation processing from the portable information device of the photographing request destination (the portable information device 100 in the example).

Figure 6:
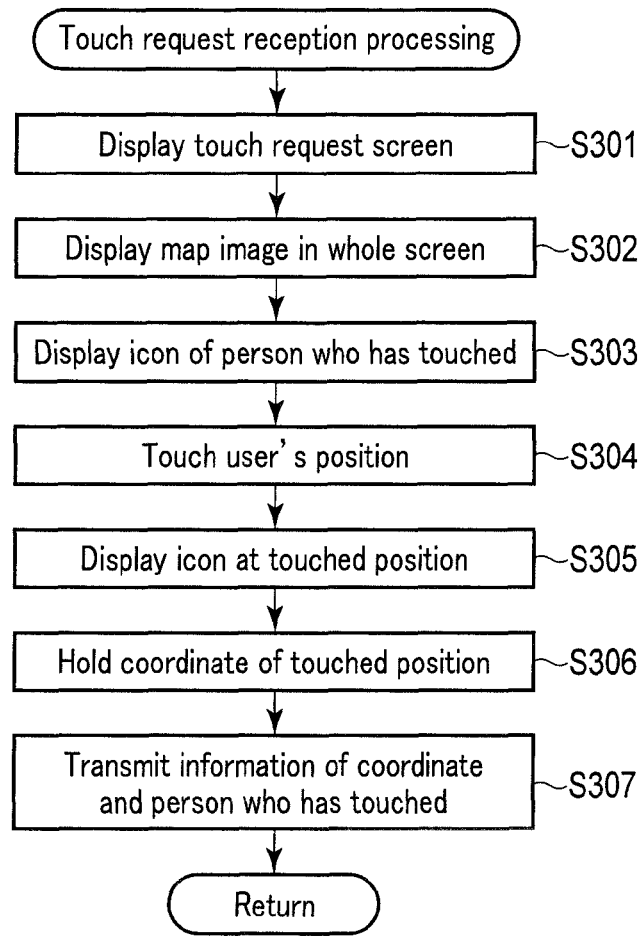
FIG. 6 is a flowchart showing touch request reception processing.

When it is determined in the step S113 that the touch request is received, the processing shifts to step S300. In the step S300, the control unit 118 executes touch request reception processing. Hereinafter, the touch request reception processing will be described with reference to FIG. 6. FIG. 6 is a flowchart showing the touch request reception processing. The processing of FIG. 6 is controlled by the control unit 118 of the portable information device of the photographing request destination (the portable information device 200 in the example).

Figure 12A:
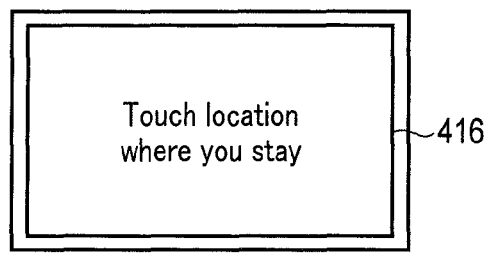
FIG. 12A, FIG. 12B, FIG. 12C, FIG. 12D, FIG. 12E and FIG. 12F are views showing examples of a screen to be displayed in a display of a portable information device of a photographing request destination.

In step S301, the control unit 118 of the portable information device 200 displays such a touch request screen 416 as shown in FIG. 12A in the display 106. In the touch request screen 416, there is displayed, for example, a message that prompts the user to touch a location of the user on the map image. According to this message, the user of the portable information device of the photographing request destination can recognize that the touch request reception processing is started.

In step S302, the control unit 118 displays the map image transmitted together with the touch request from the portable information device of the photographing request source (the portable information device 100 in the example) in the display 106. This display is performed in the same manner as in FIG. 11D.

Figure 12D:
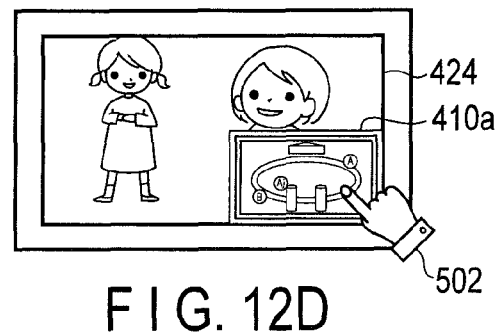
Figure 12B:
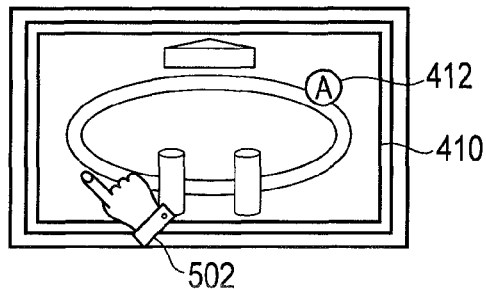

In step S303, as shown in FIG. 12B, the control unit 118 displays the icon 412 indicating the location of the user of the portable information device 100 on the map image 410 displayed in the display 106 on the basis of the coordinate data transmitted together with the touch request from the portable information device of the photographing request source (the portable information device 100 in the example).

In step S304, as shown in FIG. 12B, the user of the portable information device 200 touches a position indicating the location of the user in the map image 410 displayed in the display 106, with a finger 502 or the like. Upon receiving this operation, the control unit 118 acquires a coordinate of the location selected by the user, from the output of the touch operating unit 108. It is to be noted that the embodiment may have a constitution in which the touch request reception processing is ended when there are not any touches in predetermined time. In this case, it is preferable to send a notification indicating that cooperative photographing is not performed to the portable information device of the photographing request source (the portable information device 100 in the example).

Figure 12E:
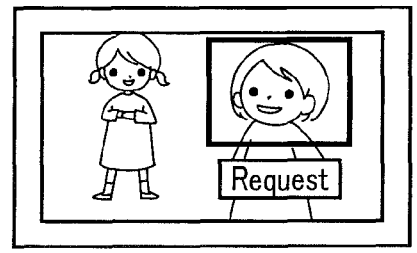
Figure 12C:
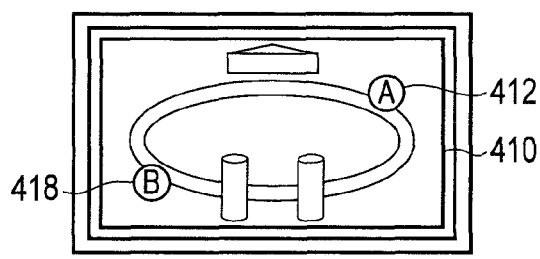

In step S305, as shown in FIG. 12C, the control unit 118 displays an icon 418 indicating the location of the user of the portable information device 200, on the map image 410 displayed in the display 106, on the basis of the coordinate acquired in the step S304.

In step S306, the control unit 118 holds, in an unshown memory, the coordinate data transmitted together with the touch request from the portable information device of the photographing request source (the portable information device 100 in the example) and the coordinate data acquired in the step S304.

In step S307, the control unit 118 uses the communicating unit 112 to transmit the coordinate data acquired in the step S304 and data indicating information (e.g., the user name) of the person who has touched to the portable information device of the photographing request source (the portable information device 100 in the example). Afterward, the touch request reception processing is ended. After the touch request reception processing is ended, the processing returns to the step S111 of FIG. 4.

Here, the description returns to FIG. 4. When it is determined in the step S113 that the touch request is not received, the processing shifts to step S114. In the step S114, the control unit 118 determines whether or not the map image is present. It is determined in the step S114 that the map image is present when the map image preparation processing is performed. When it is determined in the step S114 that the map image is not present, the processing returns to the step S111.

When it is determined in the step S114 that the map image is present, the processing shifts to step S115. In the step S115, the control unit 118 determines whether or not the coordinate data is received from the portable information device of the photographing request destination (the portable information device 200 in the example).

Figure 7:
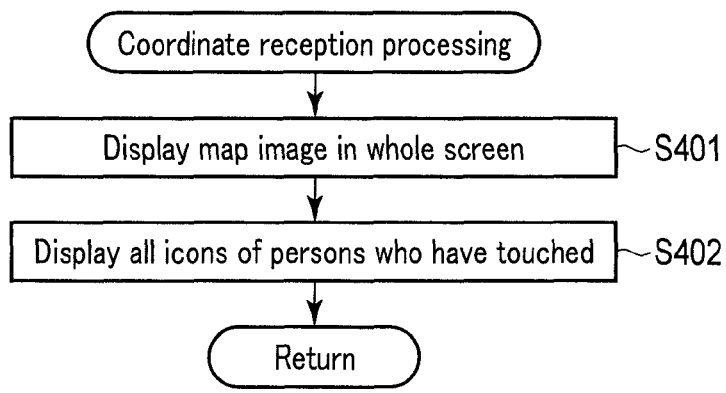
FIG. 7 is a flowchart showing a coordinate reception processing.

When it is determined in the step S115 that the coordinate data is received from the portable information device of the photographing request destination, the processing shifts to step S400. In the step S400, the control unit 118 executes coordinate reception processing. Hereinafter, the coordinate reception processing will be described with reference to FIG. 7. FIG. 7 is a flowchart showing the coordinate reception processing. The processing of FIG. 7 is controlled by the control unit 118 of the portable information device of the photographing request source (the portable information device 100 in the example).

In step S401, the control unit 118 displays the map image acquired in the map image preparation processing in the whole screen of the display 106. This process is performed in the same manner as in FIG. 11D. According to this display of the map image, the user of the portable information device of the photographing request source can recognize that the coordinate reception processing is started.

In step S402, the control unit 118 displays icons indicating all the users' locations designated on the map image (the location of the user of the portable information device 100 and the location of the user of the portable information device 200 in the example), on the basis of the coordinate data held in the map image preparation processing and the coordinate data received in the step S115. This process is performed in the same manner as in FIG. 12C. Afterward, the coordinate reception processing is ended. After the coordinate reception processing is ended, the processing returns to the step S111 of FIG. 4.

Here, the description returns to FIG. 4. When it is determined in the step S115 that the coordinate data is not received from the portable information device of the photographing request destination, the processing shifts to step S116. In the step S116, the control unit 118 of the portable information device 100 determines whether or not an icon of a partner of the photographing request destination (the icon 418 indicating the location of the user of the portable information device 200 in the example) is touched in the map image displayed as the result of the coordinate reception processing in the display 106.

Figure 8:
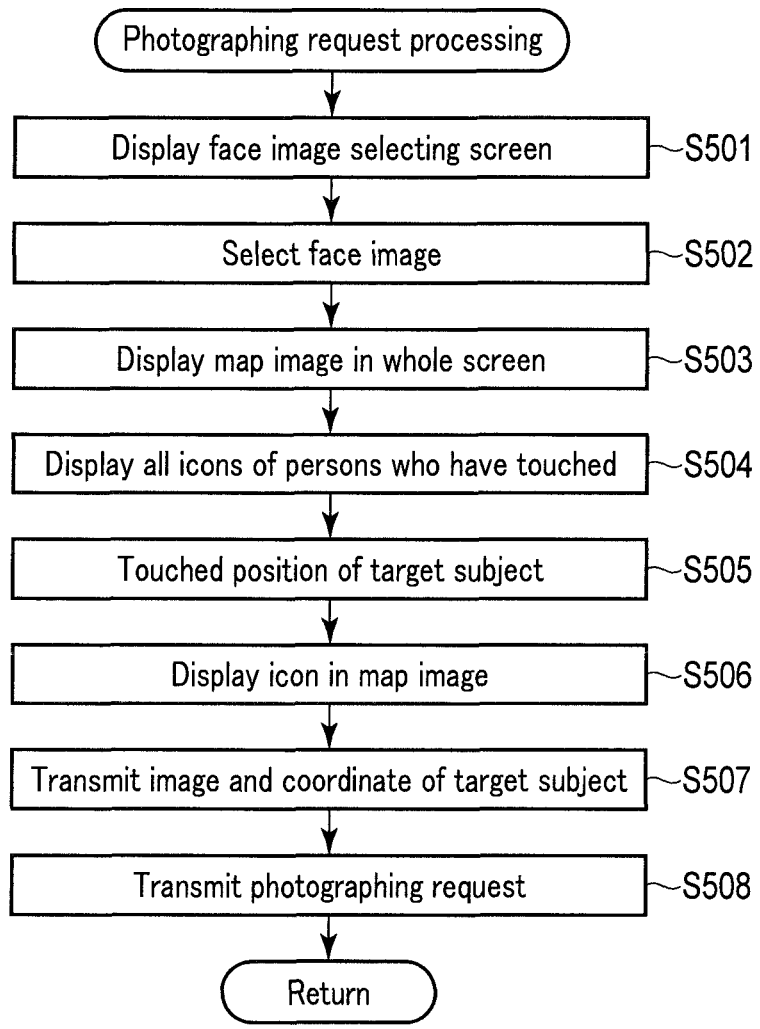
FIG. 8 is a flowchart showing photographing request processing.

When it is determined in the step S116 that the icon of the partner of the photographing request destination is touched, the processing shifts to step S500. In the step S500, the control unit 118 executes photographing request processing. Hereinafter, the photographing request processing will be described with reference to FIG. 8. FIG. 8 is a flowchart showing the photographing request processing. The processing of FIG. 8 is controlled by the control unit 118 of the portable information device of the photographing request source (the portable information device 100).

Figure 11H:
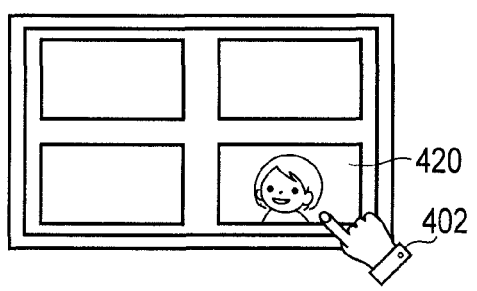

In step S501, the control unit 118 of the portable information device 100 displays such a face image selecting screen as shown in FIG. 11H in the display 106. As shown in FIG. 11H, in the face image selecting screen, there is displayed a list of face images 420 that are candidates of a target subject that is an object present in a target location. It is to be noted that, here, the face images are displayed, but the image is not limited to the face image as long as the subject can be specified by the image.

In step S502, the user of the portable information device 100 touches a desirable face image (an image of a child in the example) among the face images displayed in the face image selecting screen, with the finger 402 or the like, thereby selecting the target subject. Upon receiving this operation, the control unit 118 distinguishes the face image selected by the user, from the output of the touch operating unit 108. It is to be noted that the embodiment may have a constitution in which photographing request reception processing is ended when there are not any touches in predetermined time. In this case, it is preferable to send a notification indicating that the cooperative photographing is not performed to the portable information device of the photographing request destination (the portable information device 200 in the example).

In step S503, the control unit 118 displays the map image acquired in the map image preparation processing in the whole screen of the display 106. This process is performed in the same manner as in FIG. 11D.

In step S504, the control unit 118 displays the icons indicating all the users' locations designated on the map image (the location of the user of the portable information device 100 and the location of the user of the portable information device 200 in the example), on the basis of the coordinate data held in the map image preparation processing and the coordinate data received in the step S115.

Figure 11I:
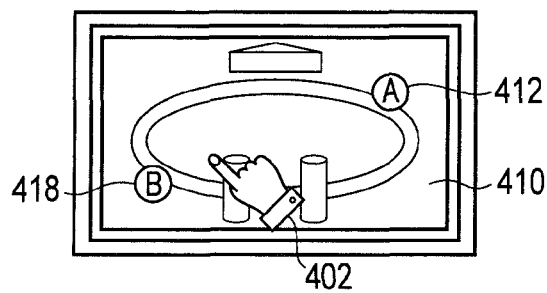

In step S505, as shown in FIG. 11I, the user of the portable information device 100 touches a position indicating a location of the target subject in the map image 410 displayed in the display 106, with the finger 402 or the like. Upon receiving this operation, the control unit 118 acquires a coordinate of the location of the target subject designated by the user, from the output of the touch operating unit 108. It is to be noted that the embodiment may have a constitution in which the touch request reception processing is ended when there are not any touches in predetermined time. In this case, it is preferable to send a notification indicating that the cooperative photographing is not performed to the portable information device of the photographing request destination (the portable information device 200 in the example).

Figure 11J:
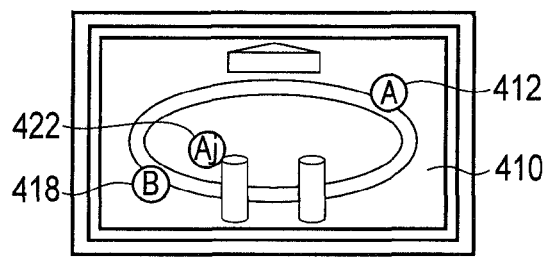

In step S506, as shown in FIG. 11J, the control unit 118 displays an icon 422 indicating the location of the target subject, on the map image 410 displayed in the display 106 on the basis of the coordinate data acquired in the step S505.

In step S507, the control unit 118 uses the communicating unit 112 to transmit face image data selected by the user and the coordinate data acquired in the step S505 to the portable information device of the photographing request destination (the portable information device 200 in the example).

In step S508, the control unit 118 uses the communicating unit 112 to transmit a photographing request to the portable information device of the photographing request destination (the portable information device 200 in the example). Afterward, the photographing request processing is ended. After the photographing request processing is ended, the processing returns to the step S111 of FIG. 4.

Here, the description returns to FIG. 4. When it is determined in the step S116 that the icon of the partner of the photographing request destination is not touched, the processing shifts to step S117. In the step S117, the control unit 118 determines whether or not the photographing request is received from the portable information device of the photographing request source (the portable information device 100 in the example).

Figure 9:
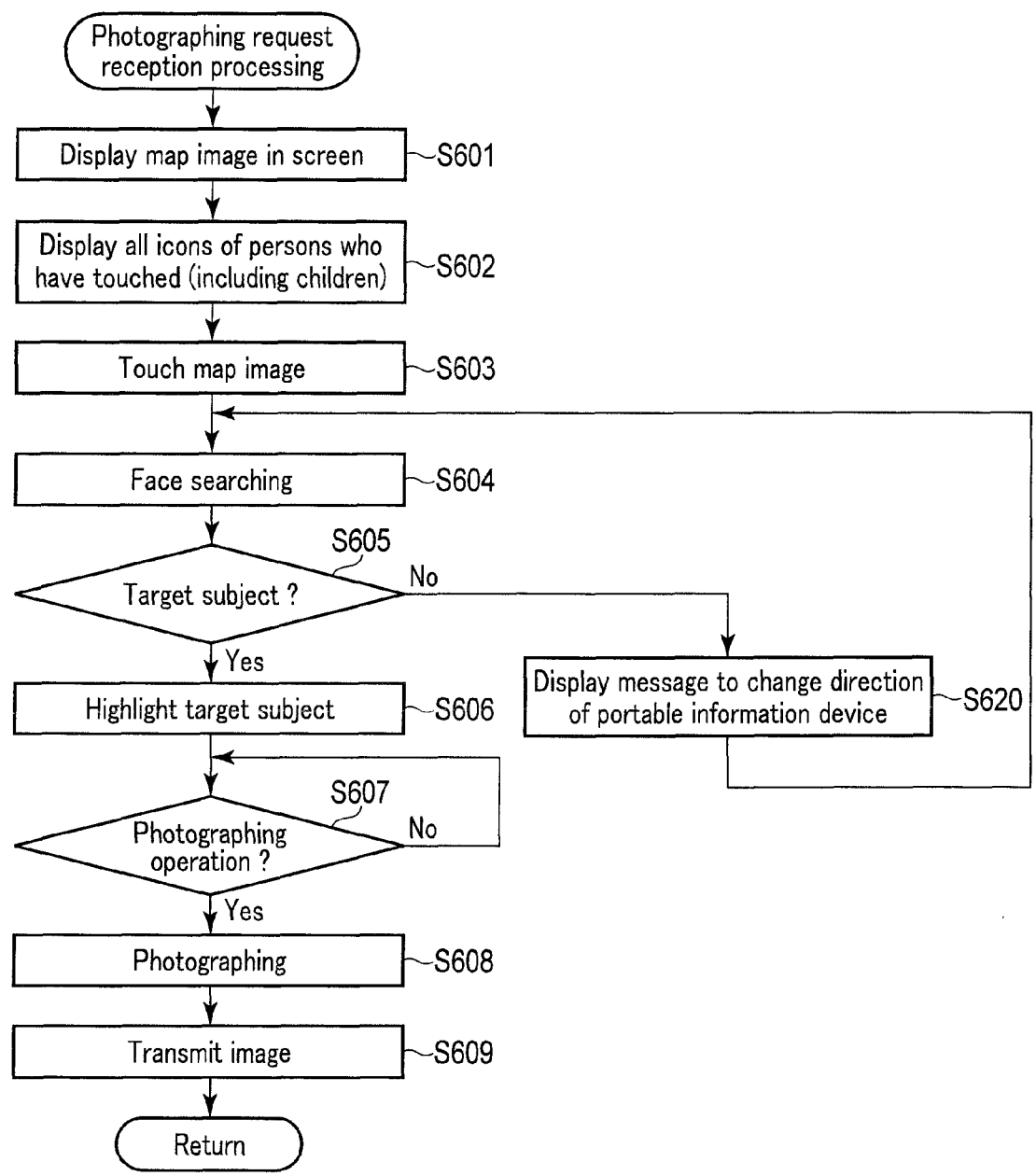
FIG. 9 is a flowchart showing photographing request reception processing.

When it is determined in the step S117 that the photographing request is received from the portable information device of the photographing request source, the processing shifts to step S600. In the step S600, the control unit 118 executes the photographing request reception processing. Hereinafter, the photographing request reception processing will be described with reference to FIG. 9. FIG. 9 is a flowchart showing the photographing request reception processing. The processing of FIG. 9 is controlled by the control unit 118 of the portable information device of the photographing request destination (the portable information device 200 in the example).

In step S601, as shown in FIG. 12D, the control unit 118 of the portable information device 200 displays a reduced image 410a of the map image transmitted from the portable information device of the photographing request source (the portable information device 100 in the example) so that the reduced image is superimposed on a live view image 424 in the display 106. In consequence, the user of the portable information device of the photographing request destination can recognize that the photographing request reception processing is started.

In step S602, as shown in FIG. 12D, the control unit 118 displays icons indicating locations of the user and the target subject which are designated on the map image, on the basis of the coordinate data transmitted together with the photographing request from the portable information device of the photographing request source (the portable information device 100 in the example) and the coordinate data held in the step S306.

In step S603, the user of the portable information device 200 touches the map image 410 displayed in the display 106 with the finger 502 or the like. It is to be noted that the embodiment may have a constitution in which the photographing request reception processing is ended when there are not any touches in predetermined time. In this case, it is preferable to send a notification indicating that the cooperative photographing is not performed to the portable information device of the photographing request source (the portable information device 100 in the example).

In step S604, the control unit 118 detects, from the live view image 424, a face similar to the face image transmitted together with the photographing request from the portable information device of the photographing request source (the portable information device 100 in the example), to detect the target subject in the live view image 424.

In step S605, the control unit 118 determines whether or not the target subject can be detected in the live view image 424.

When it is determined in the step S605 that the target subject can be detected in the live view image 424, the processing shifts to step S606. In the step S606, the control unit 118 highlights the detected target subject. FIG. 12E shows an example of the highlighting. In one example of the highlighting, a frame that surrounds the target subject is displayed. The highlighting may be performed by another technique.

In step S607, the control unit 118 determines whether or not the photographing operation by the user is performed. The photographing operation is, for example, the touching operation onto the display screen of the display 106. The photographing operation may be performed by a technique other than the touching operation. The processing is on standby until it is determined in the step S607 that the photographing operation is performed. The embodiment may have a constitution in which the photographing request reception processing is ended after an elapse of predetermined time.

When it is determined in the step S607 that the photographing operation is performed, the processing shifts to step S608. In the step S608, the control unit 118 executes the photographing processing. That is, the control unit 118 operates the imager 102. Further, the control unit 118 performs the image processing of the image data obtained by the operation of the imager 102, in the image processing unit 104.

In step S609, the control unit 118 uses the communicating unit 112 to transmit the image data obtained by the photographing operation to the portable information device of the photographing request source (the portable information device 100 in the example). Afterward, the photographing request reception processing is ended. After the photographing request reception processing is ended, the processing returns to the step S111 of FIG. 4.

Figure 12F:
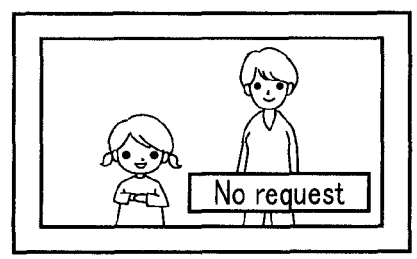

When it is determined in the step S605 that the target subject cannot be detected in the live view image 424, the processing shifts to step S620. In the step S620, the control unit 118 cannot catch the target subject, and hence, the control unit displays a message that urges the user to change a direction of the portable information device 200 in the display 106. Afterward, the processing returns to the step S604. FIG. 12F shows one example of this message. The user of the portable information device 200 who has seen such a message as shown in FIG. 12F is expected to change the direction of the portable information device 200, thereby searching for the target subject. It is to be noted that, when the message is displayed, the face image may be displayed together. When the face image is displayed, the user can easily find the target subject.

Here, the description returns to FIG. 4. When it is determined in the step S117 that the photographing request is not received from the portable information device of the photographing request source, the processing shifts to step S118. In the step S118, the control unit 118 determines whether or not the image data is received from the portable information device of the photographing request destination (the portable information device 200 in the example). When it is determined in the step S118 that the image data is not received from the portable information device of the photographing request destination, the processing returns to the step S111.

When it is determined in the step S118 that the image data is received from the portable information device of the photographing request destination, the processing shifts to step S700. In the step S700, the control unit 118 executes image reception processing. Hereinafter, the image reception processing will be described with reference to FIG. 10. FIG. 10 is a flowchart showing the image reception processing. The processing of FIG. 10 is controlled by the control unit 118 of the portable information device of the photographing request source (the portable information device 100 in the example).

Figure 11K:
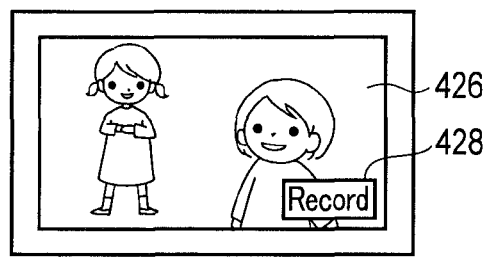

In step S701, as shown in FIG. 11K, the control unit 118 displays a photographed image 426 in the whole screen of the display 106 on the basis of the received image data. Furthermore, the control unit 118 displays a record button 428 on the photographed image 426 displayed in the whole screen. In consequence, the user of the portable information device of the photographing request source can recognize that the image reception processing is started.

Figure 11L:
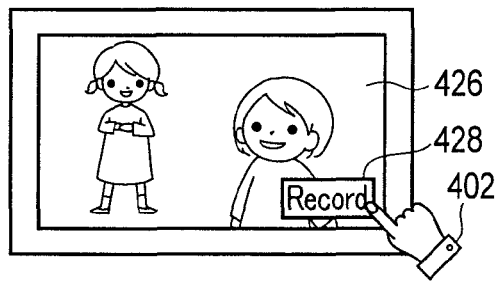

In step S702, the user of the portable information device 100 touches the record button 428 with the finger 402 or the like as shown in FIG. 11L. Upon receiving this operation, the control unit 118 recognizes that the record button 428 is touched from the output of the touch operating unit 108. It is to be noted that the embodiment may have a constitution in which the image reception processing is ended when there are not any touches in predetermined time.

In step S703, the control unit 118 records the received image data in the image recording section 1102. Afterward, the image reception processing is ended. After the image reception processing is ended, the processing returns to the step S111 of FIG. 4.

As described above, according to the present embodiment, the photographing requester can easily and suitably request the photographing of the target subject. In addition, the photographer performs the photographing while seeing the map image in which the location of the target subject is displayed, so that the photograph can be taken as requested by the photographing requester.

Here, in the present embodiment, the icon 412 indicating the location of the user of the portable information device of the photographing request source and the icon 418 indicating the location of the user of the portable information device of the photographing request destination are displayed in the map image 410, but these icons do not necessarily have to be displayed in the map image 410. In this case, the user of the portable information device of each of the photographing request source and the photographing request destination does not need to touch and input the location of the user.

Hereinafter, modifications of the present embodiment will be described.

[Modification 1]

Figure 13:
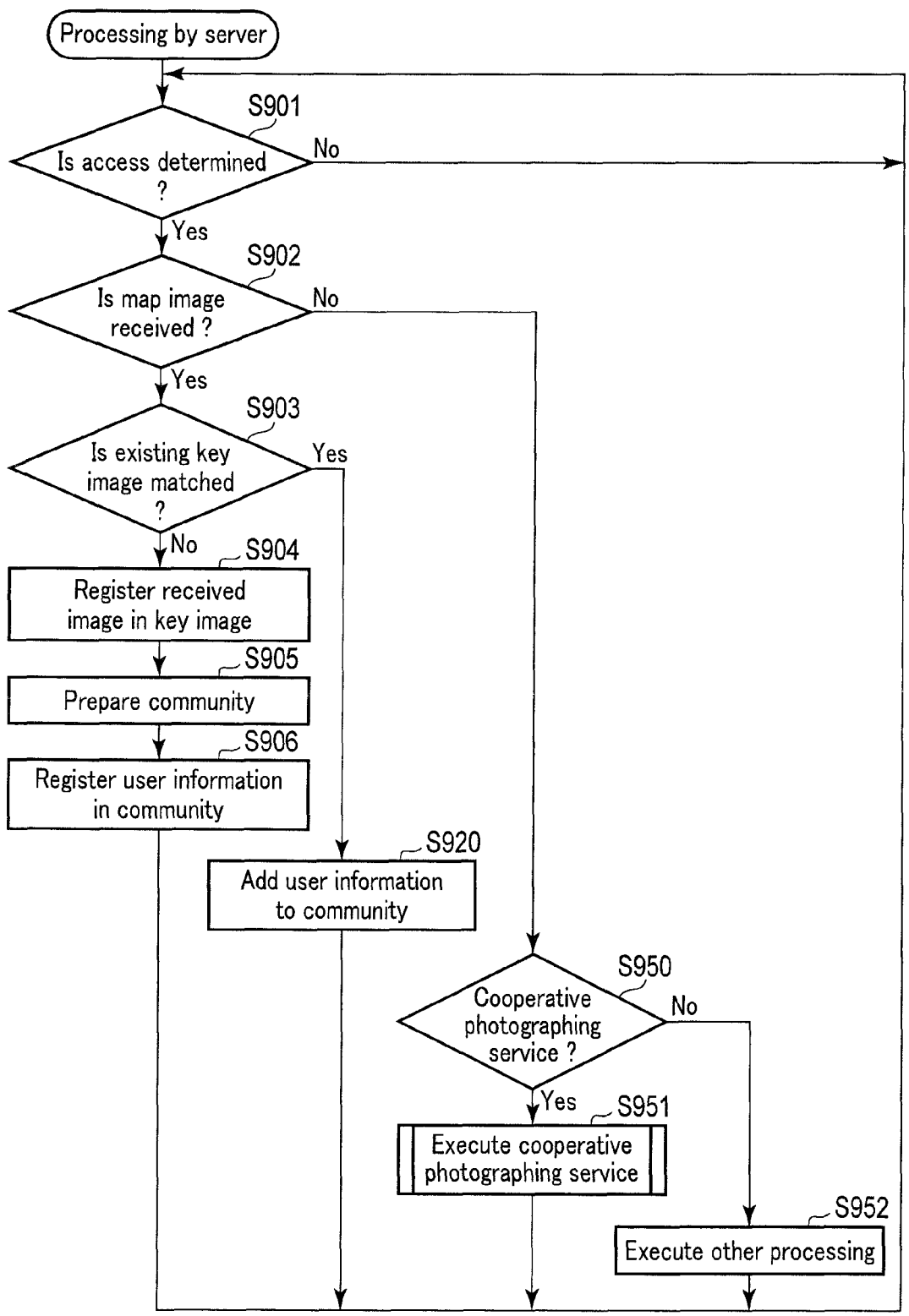
FIG. 13 is a flowchart showing processing of a server in Modification 1.

The abovementioned embodiment shows an example where the portable information device 100 and the portable information device 200 directly communicate to perform photographing. On the other hand, a server 300 may be interposed between the portable information device 100 and the portable information device 200. Hereinafter, such a modification will be described. FIG. 13 is a flowchart showing main processing of the server 300. The processing of FIG. 13 is controlled by a control unit 306 of the server 300.

In step S901, the control unit 306 of the server 300 determines whether or not there is an access of the portable information device 100, the portable information device 200 or the like. In the step S901, the processing is on standby until it is determined that the access is present.

When it is determined in the step S901 that the access is present, the processing shifts to step S902. In the step S902, the control unit 306 determines whether or not map image data is received from the portable information device 100 or the portable information device 200. The map image data sent in the step S902 is transmitted to the server 300 by processing of, e.g., the step S104 of FIG. 4 or the like.

When it is determined in the step S902 that the map image data is received, the processing shifts to step S903. In the step S903, the control unit 306 determines whether or not the received map image data matches map image data as a key image recorded in a key image recording section 3023.

When it is determined in the step S903 that the received map image data does not match the map image data as the key image recorded in the key image recording section 3023, the processing shifts to step S904. In the step S904, the control unit 306 registers the received map image data as the key image of a new community in the key image recording section 3023.

In step S905, the control unit 306 prepares the new community. In step S906, the control unit 306 registers data indicating information (e.g., a user name) indicating a user of the portable information device which has transmitted the map image data, as information of a member of the community prepared in the step S905 in a community information recording section 3021. Afterward, the processing returns to the step S901.

When it is determined in the step S903 that the received map image data matches the map image data as the key image recorded in the key image recording section 3023, the processing shifts to step S920. In this case, the community has already been prepared, and hence, in the step S920, the control unit 306 registers the data indicating the information (e.g., the user name) indicating the user of the portable information device which has transmitted the map image data, as the information of the corresponding community member in the community information recording section 3021. Afterward, the processing returns to the step S901. It is to be noted that the processing of the step S920 is not performed in a case where the user information has already been registered.

When it is determined in the step S902 that the map image data is not received, the processing shifts to step S950. In the step S950, the control unit 306 determines whether or not a request for a cooperating service is received from the portable information device 100 or the portable information device 200.

When it is determined in the step S950 that the request for the cooperating service is received, the processing shifts to step S951. In the step S951, the control unit 306 controls the cooperating service. The cooperating service is performed in the same manner as in FIG. 4 to FIG. 10. However, in Modification 1, the user of the portable information device 100 and the user of the portable information device 200 belong to the same community. Further, the control unit 306 of the server 300 mediates data exchange in the cooperating service between the portable information devices belonging to the same community, or transmits screen data required to display various screens in the portable information device. After such a cooperating service is performed, the processing returns to the step S901.

When it is determined in the step S950 that the request for the cooperating service is not received, the processing shifts to step S952. In the step S952, the control unit 306 executes processing other than the processing in the case where the map image is received and other than the cooperating service. This processing is, for example, processing of recording a received photographed image in an image recording section 3022 when the photographed image is received. After the other processing is executed, the processing returns to the step S901.

As described above, according to Modification 1, it is possible to execute cooperative photographing between the portable information devices belonging to the same community.

It is to be noted that, in Modification 1, there is shown the example where the user information is registered in the community information recording section 3021 by receiving the map image data. However, when the user information is registered in the community information recording section 3021, it is not essential to receive the map image data. For example, the present modification may have, for example, a constitution in which the user information is registered in the community information recording section 3021 by inputting an electronic mail address.

[Another Modification]

In the abovementioned embodiment and Modification 1, there has been described an application example to a photographing system in which photographing is requested by designating a location of a target subject on a map image. On the other hand, the present communication system is applicable to various systems having a constitution in which one portable information device informs the other portable information device of a target location to transmit a request for a predetermined action to be performed. In this respect, the present communication system is expected to be applied to various fields such as a medical field and the like.

Each processing by the abovementioned embodiment can be stored as a program that can be executed by a CPU or the like as a computer. Additionally, the program can be stored and distributed in a storage medium of an external storage device such as a memory card, a magnetic disc, an optical disc or a semiconductor memory. Further, the CPU or the like reads the program stored in the storage medium of this external storage device, and an operation is controlled in accordance with this read program, so that the abovementioned processing can be executed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A location information designating device comprising:
   a location confirming image acquiring section that acquires a location confirming image by which location information is confirmable;
   a display control section that causes a display to display the acquired location confirming image;
   an operating unit that designates, responsive to a first received user input, a position of the user in the location confirming image displayed by the display, wherein, responsive to the designation of the position of the user, the display control section further causes the display to (1) display an icon at a location within the location confirmation image corresponding to the designated position of the user, and (2) display a button for receiving a transmission command from the user;
   a memory that holds coordinates corresponding to the designated position of the user; and
   a communicating unit that transmits, to an external information device, information about the user, the coordinates held in memory, and the acquired location confirming image,
   wherein, responsive to a determination that the user has input a request to have a partner user take a photograph, (1) the operating unit selects, responsive to a second received user input, a target object, (2) the display control section causes the display to display the location confirming image and icons, within the location confirming image, corresponding to any users that have designated their position, (3) the operating unit designates, responsive to a third received user input, coordinates of the target object, and (4) the communicating unit transmits, to an external information device used by the partner user, the coordinates of the target object, together with a request for an action to be performed by the partner user of the external information device.

2. The location information designating device according to claim 1,
   wherein, responsive to the determination that the user has input a request to have a partner user take a photograph, the communicating unit further transmits image data of the target object to the external information device.

3. The location information designating device according to claim 1,
   wherein the operating unit further designates a location of the location information designating device in the location confirming image displayed by the display, and
   the communicating unit further transmits the location of the location information designating device to the external information device.

4. The location information designating device according to claim 1,
   wherein the location confirming image acquiring section acquires the location confirming image to be displayed by the display from the location confirming images recorded in a location confirming image recording section.

5. The location information designating device according to claim 1,
   wherein the location confirming image acquiring section acquires an image obtained by imaging a subject as the location confirming image to be displayed by the display.

6. The location information designating device according to claim 1,
   wherein the location confirming image includes a map image.

7. The location information designating device according to claim 1,
   wherein the external information device is a portable information device having a photographing function, and
   the request for the action is a photographing request.

8. The location information designating device of claim 1 wherein, responsive to the determination that the user has input a request to have a partner user take a photograph, the display control section further causes the display to display a plurality of candidate target objects, and wherein the target object is selected from among the plurality of candidate target objects.

9. A location information designating method comprising:
   acquiring a location confirming image by which location information is confirmable;
   displaying the acquired location confirming image by a display;
   designating, responsive to a first received user input, a position of the user in the location confirming image displayed by the display;
   responsive to the designation of the position of the user, (1) displaying an icon at a location within the location confirmation image corresponding to the designated position of the user, and (2) displaying a button for receiving a transmission command from the user;
   storing coordinates corresponding to the designated position of the user; and
   transmitting, to an external information device, information about the user, the coordinates held in memory, and the acquired location confirming image; and responsive to a determination that the user has input a request to have a partner user take a photograph, (1) selecting, responsive to a second received user input, a target object, (2) displaying the location confirming image and icons, within the location confirming image, corresponding to any users that have designated their position, (3) designating, responsive to a third received user input, coordinates of the target object, and (4) transmitting, to an external information device used by the partner user, the coordinates of the target object, together with a request for an action to be performed by the partner user of the external information device.

10. A non-transitory storage medium in which there is stored a location information designating program which, when executed by a system including a least one processor, causes the system to perform a method comprising:

acquiring a location confirming image by which location information is confirmable;

displaying the acquired location confirming image by a display;

designating, responsive to a first received user input, a position of the user in the location confirming image displayed by the display;

responsive to the designation of the position of the user, (1) displaying an icon at a location within the location confirmation image corresponding to the designated position of the user, and (2) displaying a button for receiving a transmission command from the user;

storing coordinates corresponding to the designated position of the user; and transmitting, to an external information device, information about the user, the coordinates held in memory, and the acquired location confirming image; and responsive to a determination that the user has input a request to have a partner user take a photograph, (1) selecting, responsive to a second received user input, a target object, (2) displaying the location confirming image and icons, within the location confirming image, corresponding to any users that have designated their position, (3) designating, responsive to a third received user input, coordinates of the target object, and (4) transmitting, to an external information device used by the partner user, the coordinates of the target object, together with a request for an action to be performed by the partner user of the external information device.

* * * * *